S. Ingersoll,
Drag Saw.
N° 12,821.                                  Patented May 8, 1855.
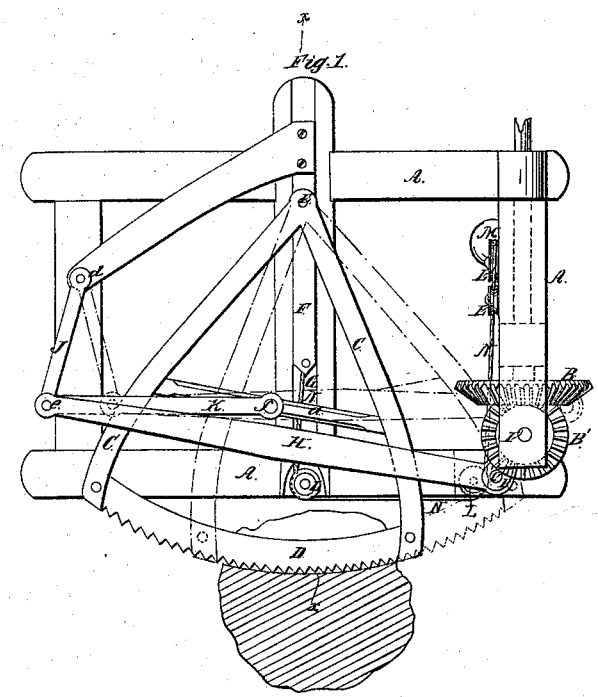
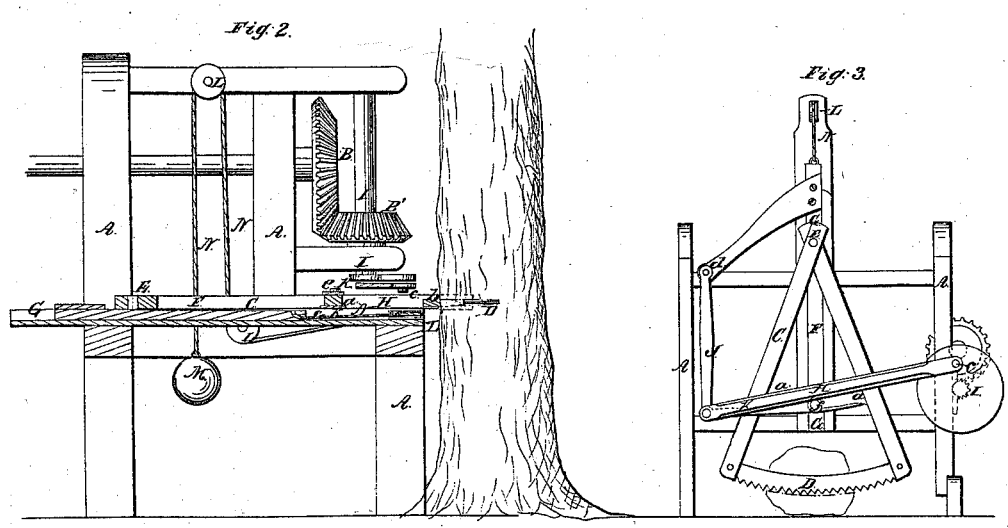

UNITED STATES PATENT OFFICE.

SIMON INGERSOLL, OF GREENWICH, CONNECTICUT.

MACHINE FOR SAWING OR FELLING TREES.

Specification of Letters Patent No. 12,821, dated May 8, 1855.

*To all whom it may concern:*

Be it known that I, SIMON INGERSOLL, of Greenwich, in the county of Fairfield and State of Connecticut, have invented a new and useful Improvement in Sawmills for Sawing Down Trees; and I do hereby declare that the following is a full, clear, and exact description of the same, reference being had to the accompanying drawings, forming part of this specification, in which—

Figure 1, is a plan or top view of the machine for sawing down trees constructed after my invention. Fig. 2, is a vertical central section of the same through the line $x, x$, in Fig. 1. Fig. 3, shows a front view of my invention arranged for cutting up the trees cut down into short pieces.

Similar letters of reference in each of the several figures indicate corresponding parts.

The nature of my invention consists in providing a narrow segmental shape saw blade and arranging it in a frame and having said frame connected at its back extremity by a fulcrum pin to a horizontal slide which is arranged and plays back and forth in a groove formed in the top of the saw mill frame. The said saw frame being connected to a crank shaft through a very long lever and two links which have proper fulcra, and consequently has a reciprocating motion in the path of a circle struck from the axis upon which it turns. At the same time that the saw frame with the saw has this motion it is caused to have a forward motion in a parallel direction by the action of a weight and thus feed up to the tree as fast as the cutting is performed by the saw in its reciprocating motion.

By my arrangement, as will be presently clearly shown, I secure two necessary movements to effect the desired object and also compensate for the forward motion or feed of the saw and prevent all the strain and jarring usually resulting from the position of the connecting lever being changed to a greater or less angle, according to the distance that the saw is fed forward. I also am enabled, on account of using a narrow segmental shape saw and having a space between the back edge of the same and the fulcrum of its frame, to insert a wedge when the saw is only a short distance in the tree and thus frevent the weight of the tree cramping and causing the saw to buckle and break.

To enable others skilled in the art to make and use my invention I will proceed to describe its construction and operation.

A, A, Figs. 1 and 2, represent the saw frame; B B' the gearing for operating the saw.

C, is the saw frame made of triangular shape, and D, the saw of segmental shape arranged in the front part of the frame C, as shown; this saw is made very narrow so that a space may be formed between the cross piece $a$, of the frame C; and thus allow of a wedge $b$, being employed to ease the movement of the saw while under the weight of the tree or while sawing; it is also made narrow that it shall only have to enter the tree a short distance before a wedge can be inserted, and of segmental shape so as to correspond to the motion of the saw frame and cut from end to end.

The saw frame C, is placed in a horizontal position and turns on a fulcrum E, which is secured in a slide F, as shown. By thus arranging the saw, friction is avoided owing to its having a rolling axis.

G, is the groove, in the top of the frame A, in which the slide F moves back and forth.

H, is the main lever or connecting rod of the saw frame. This rod connects by a fulcrum pin $c$, to the crank shaft I, and is jointed to a link J, which has its fulcrum at $d$,—and is also connected to the center of the saw frame by a slotted link K, as shown,—said link having fulcra at $e, f$, as shown in Fig. 1.

L, L, L, L, are pulleys arranged on the frame A; N, a cord connecting with the front end of the slide and passing around the pulleys L, L, L, L, as shown, and having a weight M, attached to its end. It is by this arrangement that the feed of the saw frame up to the work is effected.

By having a very long lever and attaching it at a point as far as possible from the crank shaft it may be evident—that the saw can make a much greater movement and have more freedom of motion. And by employing an additional link J, in connection with it the saw frame may have a movement forward the required distance without having its motion in a circle interfered with to a perceptible degree. And by connecting the lever H, and link J, to the saw frame by a slotted link K, the parallel motion of the saw will not be effected to any extent as each of the connections is formed by a loose joint.

The legs of the frame A, may be adjustable so as to elevate the saw to any position desired to suit circumstances.

By employing the arrangement shown and described, in a vertical position as shown in Fig. 3, it will answer admirably for sawing up the timber into short pieces after it is cut down. Of course a separate machine will be necessary for each operation: that is one for sawing down and the other for cutting up the timber.

Operation: The machine Fig. 2, is chained or clamped to the log or stump after the saw is in proper position for cutting; power is applied to the driving shaft and motion transmitted through the gearing B, B', I, to the lever H, J, and from it by the link K, to the saw frame; the motion the saw has given it causes it to move in the path of a circle as indicated in red. At the some time that the saw has this motion the weight M, through the cords and slide gives the saw a parallel forward motion and thus feeds it up to the tree as fast as the sawing is performed. When the full width of the blade has entered the tree a wedge $b$, is inserted, as shown in red, behind the saw and the cramping and breaking of the saw thereby prevented.

This machine is very light cheap and portable and also very useful for the purposes intended.

What I claim as new and useful herein and desire to secure by Letters Patent, is—

The manner herein described of giving to the segmental saw its reciprocating action during the forward feed of the same by means of the pitman (H) connected by link rod (K) to the saw frame and by joint or link rod (J) to the slide carrying the saw or saw frame and giving forward feed thereto, substantially as and for the purposes set forth.

SIMON INGERSOLL.

Witnesses:
W. McMullen,
D. B. Taylor.